Nov. 1, 1949 — E. DANNER — 2,486,737
METHOD OF MANUFACTURING GLASSWARE
Filed Nov. 14, 1945 — 5 Sheets-Sheet 1
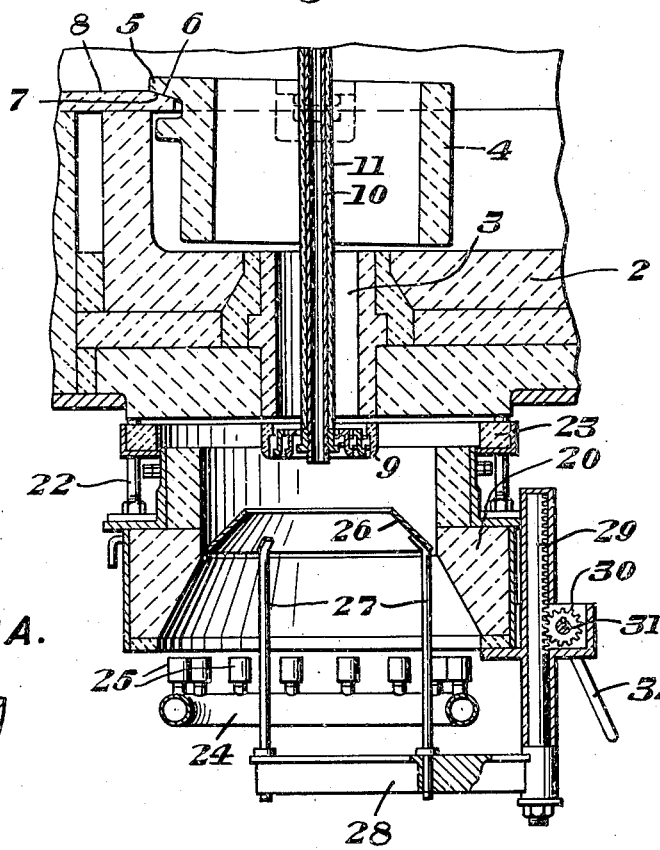
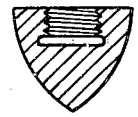
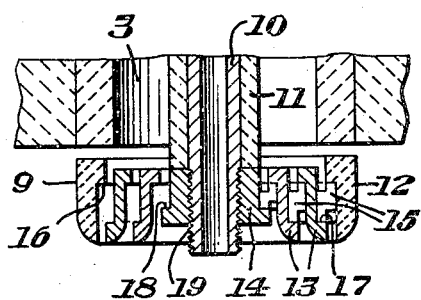
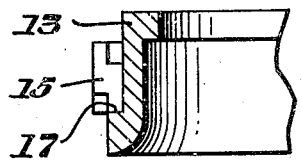
INVENTOR
Edward Danner
by his attorneys
Stebbins, Blenko & Webb INVENTOR
Edward Danner Nov. 1, 1949 — E. DANNER — 2,486,737
METHOD OF MANUFACTURING GLASSWARE
Filed Nov. 14, 1945 — 5 Sheets-Sheet 3

INVENTOR
Edward Danner
by his attorneys
Stebbins, Blenko & Webb

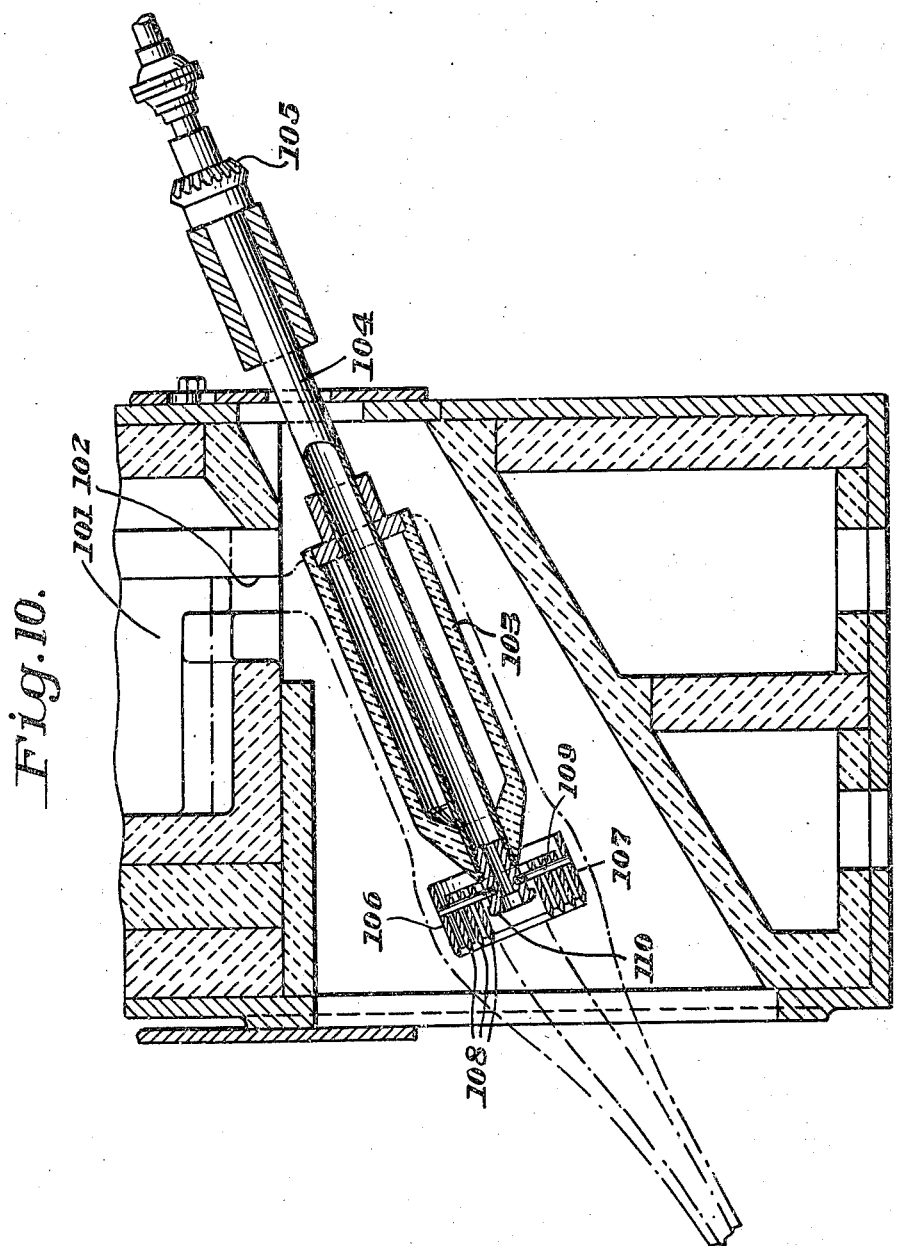

Patented Nov. 1, 1949

2,486,737

UNITED STATES PATENT OFFICE 2,486,737

METHOD OF MANUFACTURING GLASSWARE

Edward Danner, Newark, Ohio

Application November 14, 1945, Serial No. 628,492

2 Claims. (Cl. 49—83.1)

The present invention relates to the manufacture of glassware, and more particularly to the manufacture of glassware in tubular or rod form. It provides a method of manufacturing such glassware at speeds impossible with the presently known types of apparatus, and also provides a method of manufacturing tubular glassware in sizes which cannot be made on the presently known types of apparatus. As will be apparent to those skilled in the art from the ensuing description, the method which I provide has numerous additional advantages over the presently known methods and apparatus.

The present application is a continuation-in-part of my copending applications Serial Nos. 423,255, filed December 17, 1941, which issued as Patent No. 2,462,805 on February 22, 1949, and 512,996, filed December 6, 1943, now Patent No. 2,474,302, and of application Serial No. 380,179, filed February 24, 1941, which issued as Patent No. 2,390,925 on December 11, 1945.

While the present invention is particularly useful in the manufacture of single-walled hollow glassware, i. e., tubes, pipe and the like, it is also applicable to the manufacture of glassware in rod form. It will be described specifically as applied to the manufacture of glass tubes and pipe; but, where the expression "tubular glassware" is employed hereinafter in the specification and in the claims, it is intended to include single-walled hollow glassware as well as other types of single-walled ware, such as solid rods.

Heretofore, tubular glassware has been manufactured primarily by the old Danner machine in which molten glass is discharged from an orifice and deposited on a rotating mandrel, the molten glass passing downwardly over and around the mandrel and being drawn or discharged from the lower end of the mandrel in tubular form, a blow pipe being utilized for blowing air into the hollow glass as it is discharged from the lower end of the mandrel. There are limitations on the speed with which the glassware may be formed by this process, and these limitations bear a direct relationship to the quantity of molten glass which can be controlled and delivered to the ware forming plane, i. e., the plane where the glass is discharged from the mandrel. There are also limitations on the thickness of the wall of the formed glassware. This condition is brought about by limitations on the controllable amount of glass which can be delivered at the ware forming plane in this type of apparatus. There are also limitations on the size of tubular glassware that can be manufactured on such machines, because of the limited quantity of glass which can be delivered to the ware forming plane, and because of limitations on the size of the mandrel which can be satisfactorily handled in this type of machine.

Attempts have been made to overcome the limitations mentioned above by other types of apparatus in which the molten glass is fed downwardly by gravity from an orifice in the glass melting and refining apparatus, but these methods and apparatus suffer from the same disabilities as those mentioned above in respect of the original Danner machine. Other attempts have been made to overcome these limitations by drawing the molten glass vertically from a bath of molten glass, but these efforts have not resulted in the manufacture of high quality glassware at even reasonable speeds. It has been possible by such methods to draw tubular glassware having a diameter appreciably in excess of the sizes which can be manufactured satisfactorily on the mandrel type of machine, but it has not been possible on such machines to manufacture heavy-walled, large diameter pipe. Moreover, such machines are extremely slow and, consequently, manufacturing costs are high.

My invention overcomes these objectionable features of the prior art methods and apparatus. I accomplish the desired objectives by a method comprising the steps of causing a body of molten glass to flow downwardly by gravity, intercepting the downward flow of molten glass by a shaping element, separating the molten glass as it passes over the shaping element into a plurality of streams which pass through a plurality of spaced openings or passageways in the shaping element, and merging the streams of molten glass into a single, downwardly flowing body in the form of single-walled ware as the streams emerge from the openings in the shaping element at the ware forming plane. The partially formed glassware then continues downwardly beyond the shaping element and, if tube is being made, it can be passed over a sizing element or handled in any other desired way. It may be passed through a shell where it may be cooled or heated as it leaves the shaping element, depending upon the composition of the glass and other operating conditions. The manner in which the formed ware is handled or treated subsequent to the time the plurality of streams are merged together at the ware forming plane forms no part of the present invention.

In the accompanying drawings, I have shown, for purposes of illustration only, several types of apparatus which may be employed in the carrying out of my invention. In the drawings, Figure 1 is a vertical section through a portion of the forehearth of a glass melting and refining apparatus and through the shaping element and the surrounding shell;

Figure 2 is an enlarged vertical section showing more clearly the shaping element shown in Figure 1;

Figure 2A is a vertical section through a cone-shaped plug or adapter which may be threaded onto the lower end of the blow pipe shown in Figures 1 and 2 for making solid rod;

Figure 3 is a partial section through one of the shells forming the shaping element of Figure 1;

Figure 10 is a vertical sectional view illustrating my invention as applied to the rotating mandrel type of apparatus.

Figure 4:
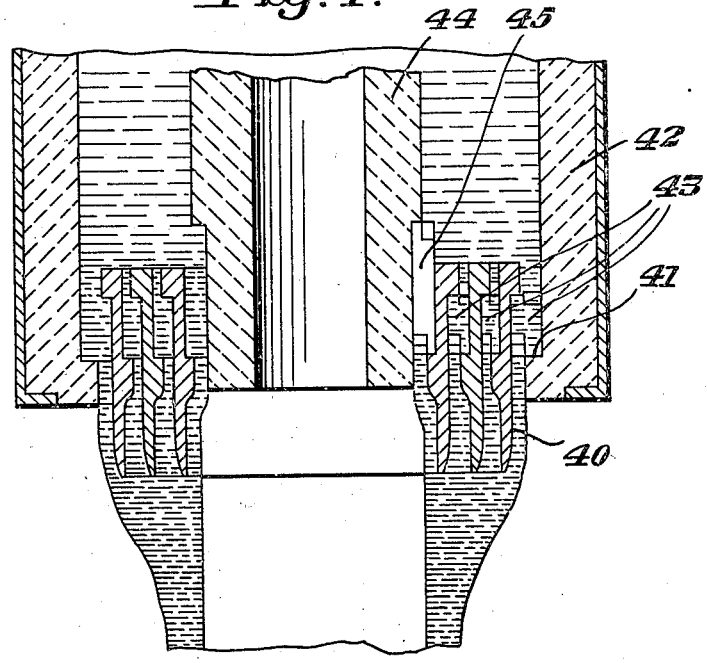
Figure 4 is a vertical section through the conduit leading from the glass melting and refining apparatus and a modified form of shaping element which may be used in carrying out my invention.

In the apparatus shown in Figure 1, the glass passes from the melting apparatus (not shown) to the forehearth 2 from which it is discharged downwardly by gravity through an outlet 3. Surrounding the outlet 3 is a refractory distributor 4 which serves to distribute the molten glass around the orifice 3 so that it will flow relatively uniformly downwardly therethrough. The upper end of the distributor 4 has an outwardly extending flange 5 which has a sloping surface 6 cooperating with a sloping surface 7 on a wedge 8. This wedge serves to raise or lower one end of the refractory distributor, and particularly the end or side positioned farthest from the point where the glass enters the forehearth. In this way, the flow of the molten glass to the orifice 3 is selectively regulated.

The glass passing downwardly through the orifice 3 is intercepted by a shaping element indicated generally by the reference character 9. The shaping element 9 is supported on the lower end of a blow pipe 10 which extends upwardly through the orifice 3 and through the glass in the forehearth, and is preferably supported on the top of the forehearth in any suitable manner. The blow pipe 10 is surrounded by a refractory sleeve 11 for protecting it against the hot molten glass. The blow pipe 10 extends to a point adjacent the lower end of the shaping element 9, and blowing air is supplied to it as an aid for controlling the form and size of the ware.

The shaping element 9 is formed of an outer shell 12, inner shells 13, a supporting ring 14 and intermediate supporting keys 15. Adjacent its upper end, the outer ring 12 has an inwardly extending shoulder 16 which rests upon the upper end of a supporting key 15. The lower end of this supporting key rests on an outwardly extending shoulder 17 on the lower end of the adjacent intermediate shell 13. The upper end of each intermediate shell 13 is provided with an inwardly extending shoulder and that shoulder rests on the upper end of a supporting key. The lower end of each supporting key 15 rests upon the lower shoulder of each shell, except the innermost supporting key 15. The lower end of that supporting key rests on an outwardly extending shoulder 18 carried adjacent the lower end of the supporting ring 14. The ring 14 is threaded for cooperation with threads 19 on the lower end of the blow pipe. The supporting members or keys 15 are relatively narrow and are spaced peripherally around the shells and are arranged to provide relatively free passage of the glass between the shells. The upper and lower portions of these keys extending between the free spaces between the shells may be beveled so as to facilitate the passage of the glass therearound and the union of the glass at the lower end of each key. These keys are more fully described in my Patent No. 2,390,925.

As is apparent from the above description of the shaping element 9, the glass is intercepted by the shaping element and passes downwardly between the shells and between the innermost shell and the blow pipe and around the outer surface of the outermost shell. The glass is delivered to the ware forming plane in a plurality of coaxial streams, and, at the ware forming plane, i. e., the plane in which the glass is merged into single-walled ware, all of these streams are brought together. The glass then passes beyond the ware forming plane as single-walled ware.

A shell 20, which is circular in form, is positioned below the forehearth and surrounds the shaping element, and the area through which the glass passes just after leaving the shaping element. This shell is formed of refractory material and supporting sheet metal members, and is supported by rods 22 from the metal supporting structure of the forehearth. The area between the forehearth and the upper end of the shell and, hence, the flow of gases through the shell may be controlled by a damper 23 which is likewise adjustable. This apparatus is more fully described in my Patent No. 2,390,925, and reference is hereby made to that application for a full and complete description thereof.

The temperature of the formed glassware after it passes over the shaping element may be controlled by any suitable means. In the apparatus of Figure 1, a circular pipe 24 is provided for supplying gas to a plurality of spaced burners 25. These burners are spaced peripherally around the bottom opening in the shell 20 and blow either heating or cooling gases into the lower end of the shell. Ordinarily, a combustible gas is supplied to these burners for supplying the desired amount of heat within the shell. The impingement of the products of combustion on the glass passing over and beyond the shaping element can be regulated by means of a hood 26 which is in the form of a truncated cone. The opening through the hood is smaller at the top than at the bottom and, as a consequence, the gases are directed inwardly against the downwardly moving glassware. The hood 26 is supported on spaced bars 27 which are carried by the frame 28. This frame 28 may be adjusted vertically by a rack bar 29 and a gear 30. The gear 30 is keyed to the shaft 31, which may be rotated by means of a handle 32 to raise or lower the hood. The raising and lowering of the hood controls or regulates the impingement of the gases upon the downwardly moving glassware. This apparatus is more fully described in my Patent No. 2,390,925, and reference is hereby made to that application for a full and complete description thereof.

In the apparatus illustrated in Figure 4, the shaping element 40 is formed of a plurality of coaxial shells. The outermost shell is supported on an inwardly extending shoulder 41 on the conduit 42 by means of a plurality of keys similar to the keys employed in the embodiment shown in Figure 1. The middle shell is, in turn, supported on the outer shell by keys, and the innermost shell is supported on the middle shell by similar keys 43. The blow pipe 44 is supported on the innermost shell by means of a key 45. This key also serves to maintain the innermost shell in proper position with respect to the adjacent shell.

In this embodiment the glass passes downwardly between the conduit 42 and the blow pipe 44, and is intercepted by the shaping element. The glass is formed into a plurality of streams passing downwardly between the shells and between the innermost shell and the blow pipe 44, and between the outermost shell and the conduit 42. At the lower ends of these shells, the separate streams of glass (4 in this case) are merged together to form single-walled ware.

Figure 5:
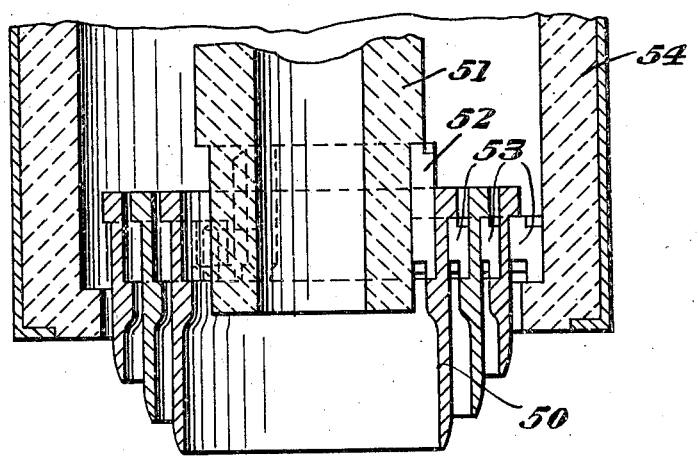
Figure 5 is a vertical section through the conduit leading from the glass melting and refining apparatus and illustrating a further form of shaping element.

In the embodiment shown in Figure 5, the shaping element 50 is formed of a plurality of coaxial shells and these shells and the blow pipe 51 are supported by keys 52 and 53 on the conduit 54. In this embodiment, the innermost shell is longer than the intermediate shell, and the intermediate shell is longer than the outermost shell so that the ware forming plane, i. e., the plane in which the several streams of glass are formed into single-walled ware, extends upwardly at an angle to the horizontal.

Figure 6:
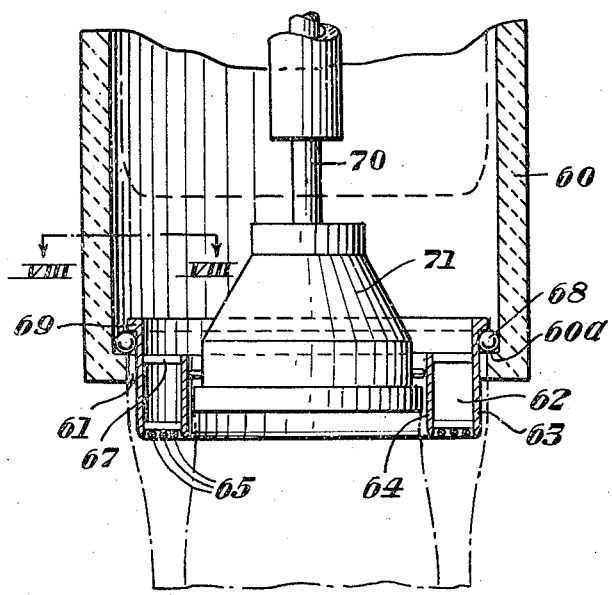
Figure 6 is a vertical section illustrating another form of shaping element which may be utilized in carrying out my invention and the supporting conduit.
Figure 7:
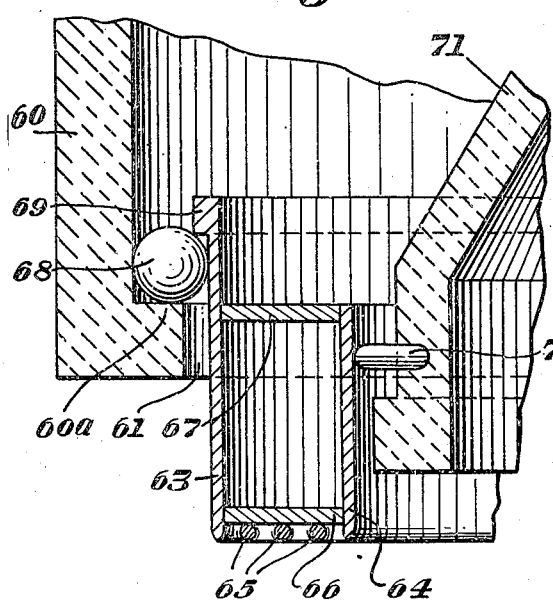
Figure 7 is a partial enlarged vertical section more clearly illustrating the shaping element and supporting apparatus of the embodiment shown in Figure 6.
Figure 8:
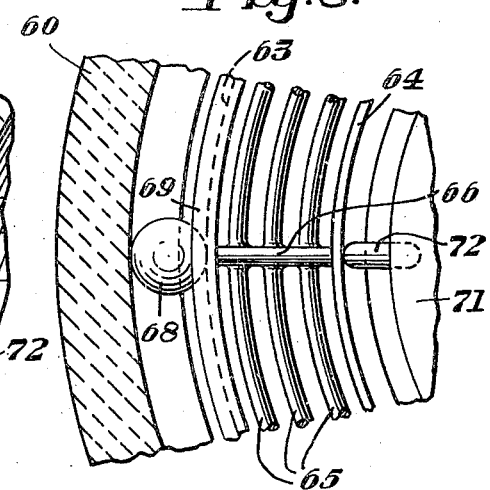
Figure 8 is a partial horizontal section taken on the line VIII—VIII of Figure 6.

In Figures 6, 7 and 8, I have shown a further type of structure which can be employed in the carrying out of my invention. In this embodiment, the glass is delivered from the forehearth to a conduit 60 which has an opening 61 at the bottom end thereof, in which the shaping element 62 is positioned. This shaping element comprises an outer shell 63, an inner shell 64 and a plurality of circular rods or wires 65 at the bottom end of the element, these rods or wires providing a plurality of spaced openings at the ware forming plane through which the molten glass may pass. The wires or rods 65 are joined together by spaced cross bars 66, the ends of which are welded or otherwise suitably secured to the juxtaposed faces of the inner and outer shells. Spaced cross bars 67 may be provided adjacent the upper end of one or both of the shells so as to tie them into a unitary structure.

The shaping element is supported on an inwardly extending flange 60a on the bottom end of the conduit 60, supporting balls 68 being provided between the flange on the conduit and an outwardly extending flange 69 on the outer shell. These supporting balls are preferably round and will permit the molten glass to flow downwardly between the conduit and the shaping element.

Blowing air is supplied by a blow pipe 70, the bottom end of which carries a downwardly flared refractory member 71. The refractory member 71 extends downwardly into the shaping element and the shaping element and the member 71 are maintained in proper spaced relation by spaced pins 72 which extend between the inner shell of the shaping element and the member 71.

In this embodiment, the molten glass preferably passes downwardly along the inner face of the wall of the conduit and is intercepted by the shaping element and the other parts just described so that, under normal operating conditions, a small pool or reservoir of glass is maintained in the lower end of the conduit. The glass passes downwardly between the inner shell and the member 71, between the inner and outer shells and through the spaces formed by the wires and the shells, and between the outer shell and the conduit. In this embodiment, as well as in all of the others, a large quantity of glass is maintained at all times at the ware forming plane. This particular embodiment is especially applicable to the manufacture of large diameter glass pipe and glass pipe having a relatively thick wall.

Figure 9:
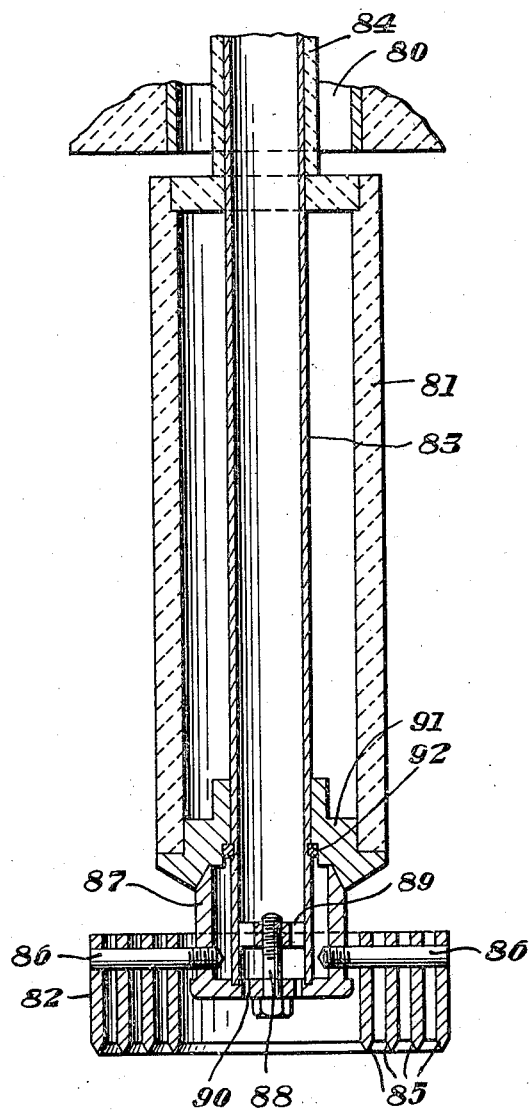
Figure 9 is a vertical section illustrating another type of shaping element and supporting apparatus which may be utilized.

In Figure 9, I have shown another apparatus which can be employed in carrying out my invention. In this embodiment, the molten glass passes from the forehearth through a conduit 80 and is deposited on the upper end of a cylindrical mandrel 81. This mandrel and the shaping element 82 are carried by a blow pipe 83 which extends upwardly through the conduit 80 and downwardly to a point within the shaping element. A refractory sleeve 84 surrounds that portion of the blow pipe which extends upwardly through the conduit 80 so as to protect it from the hot molten glass.

The glass flows downwardly over the outer surface of the mandrel 81 and, at the lower end thereof, it is deposited upon the upper end of the shaping element 82. This shaping element is formed of a plurality of coaxial shells 85 which are relatively thin and which are spaced from each other in order to provide a plurality of passageways through which the glass passes in discrete streams. An appreciable amount of glass will be maintained on the upper end of the shaping element so that there will be a substantial reservoir of glass always available at the shaping element and at the ware forming plane to permit rapid drawing and the manufacture of relatively thick-walled tubing.

The shells 85 are supported on spaced screw members 86 which extend radially thereof. The inner end of each screw member is threaded into a cap 87 which is supported in position by a screw 88 which extends through a hole in the end of the cap, and is threaded into a threaded opening in a web 89 carried within the blow pipe 83. The cap is provided with openings 90 to permit air to be blown downwardly into the formed ware.

The mandrel 81 is supported on the blow pipe by a block 91 which, in turn, is carried on the ring 92, the ring 92 surrounding the blow pipe and extending into a recess therein. The ring 92 is split, i. e., formed of two or more segments, in order to facilitate the assembly of the parts.

In Figure 10, I have illustrated a further application of my invention. In this embodiment, it is applied to the rotating type of mandrel such as is used in the old Danner machine. The molten glass is delivered from the forehearth 101 through an opening 102 and is deposited on the mandrel 103 adjacent the upper end thereof. The mandrel 103 is carried on the blow pipe 104 which is supported adjacent the upper end thereof and is provided with a gear 105 which cooperates with other gearing and driving mechanism (not shown) for rotating the pipe and the mandrel carried thereby. A shaping element 106 is carried by the bottom end of the blow pipe at the end of the mandrel so that the glass, after passing over the mandrel, is intercepted by the shaping element. The shaping element 106 is formed of an outer shell 107 and a plurality of inner shells 108. These shells are coaxial and are spaced relative to each other so as to provide a plurality of passageways through which the glass passes, and a plurality of openings at the ware forming plane from which the glass is discharged and merged into single-walled ware. The outer shell 107 is preferably longer than the inner shells, extending upwardly beyond the upper ends of the inner shells, so as to assist in maintaining a large quantity of glass at the shaping element. The shells are supported by spaced screws 109, the inner ends of which are threaded in a cap 110 which is threaded into the lower end of the blow pipe.

It will be appreciated from the above description that my invention may be utilized in a number of different types of apparatus. It will also be appreciated to those skilled in the art that, by intercepting the downwardly flowing body of glass, dividing it into a plurality of discrete streams as it passes through and over the shaping element and providing a plurality of openings through which the glass is discharged at the ware forming plane, ware may be formed at appreciably greater speeds than those obtainable by the presently known equipment and large and heavy-walled glass pipe can be made and can be produced at relatively high speeds. Moreover, that portion of the glass forming the inner surface of the ware flows freely along the inner surface of the shaping element before being discharged from the shaping element at the ware forming plane and, as a consequence, objectionable lines are not formed on the inner surface of the ware.

While I have illustrated in this application a number of different apparatus which can be utilized in carrying out my invention, it will be appreciated by those skilled in the art that it can be applied otherwise than in the manner illustrated within the scope of the appended claims.

I claim:

1. In the manufacture of tubular glassware, the steps comprising dividing a downwardly flowing body of molten glass while flowing over and through a shaping element into several downwardly moving separate tubular nested streams, restraining the flow of an inner stream flowing through the shaping element to a greater extent than the outermost and innermost streams are restrained, and causing the glass flowing over and through the shaping element to merge simultaneously at a ware forming plane into a single mass to form single walled ware therefrom.

2. In the manufacture of tubular glassware, wherein the molten glass is formed into ware by a shaping element, the steps comprising causing a body of glass to flow downwardly, intercepting the downward flow of the molten glass by the shaping element, dividing the body of molten glass into several downwardly moving separate tubular nested streams while flowing over and through the shaping element, restraining the flow of an inner stream flowing through the shaping element to a greater extent than the outermost and innermost streams are restrained, and causing the glass flowing over and through the shaping element to merge at a ware forming plane into a single mass to form single walled ware therefrom.

EDWARD DANNER.

REFERENCES CITED

The following references are of record in the file of this patent:

UNITED STATES PATENTS

| Number | Name | Date |
| --- | --- | --- |
| 2,306,164 | Harrison | Dec. 22, 1942 |

FOREIGN PATENTS

| Number | Country | Date |
| --- | --- | --- |
| 381,582 | Great Britain | Sept. 29, 1932 |
| 750,425 | France | May 29, 1933 |